United States Patent [19]
Vivian

[11] 4,174,683
[45] Nov. 20, 1979

[54] HIGH EFFICIENCY VARIABLE EXPANSION RATIO ENGINE

[76] Inventor: Howard C. Vivian, 4242 Beulah Dr., La Canada, Calif. 91011

[21] Appl. No.: 871,017

[22] Filed: Jan. 20, 1978

[51] Int. Cl.² .................. F02B 75/04; F02B 75/36; F01L 1/34; F01L 1/18
[52] U.S. Cl. .................. 123/48 C; 123/78 C; 123/109; 123/90.15; 123/90.43; 123/90.44; 123/78 R; 123/90.39
[58] Field of Search ............. 123/90.31, 90.15, 90.16, 123/78 R, 78 C, 48 R, 48 C, 109, 105, 75 E, 90.39, 90.43, 90.44, 48 A, 102, 90.11

[56] References Cited
U.S. PATENT DOCUMENTS

| | | | |
|---|---|---|---|
| 1,129,616 | 2/1915 | Weyland | 123/90.44 |
| 1,415,374 | 5/1922 | Lovejoy | 123/90.31 |
| 1,497,206 | 6/1924 | Booton | 123/75 E |
| 1,525,956 | 2/1925 | Sargent | 123/75 E |
| 1,527,001 | 2/1925 | Moore | 123/75 E |
| 1,710,291 | 4/1929 | Brush | 123/90.43 |
| 1,819,897 | 8/1931 | Johnson | 123/48 A |
| 2,142,466 | 1/1939 | Wagner | 123/48 |
| 2,670,595 | 3/1954 | Miller | 123/75 E |
| 3,475,905 | 11/1969 | Wilford | 123/97 B |
| 4,033,304 | 7/1977 | Luria | 123/75 E |

FOREIGN PATENT DOCUMENTS
845222 8/1939 France .................. 123/48 C

OTHER PUBLICATIONS
*Modern Control Engineering*, Ogata, Katsuhiko, Prentice Hall, Inc., Englewood Cliffs, N.J., 1970, p. 102.

*Primary Examiner*—Charles J. Myhre
*Assistant Examiner*—Carl S. Miller
*Attorney, Agent, or Firm*—Sellers and Brace

[57] ABSTRACT

A variable expansion ratio internal combustion engine equipped with throttleless induction control and intake valve mechanism operable to induct an ambient pressure charge varying with load demand. Maximum compression pressure is preferably somewhat below that which produces combustion detonation. Constant compression ratio from idling through full load conditions is maintained by varying the clearance volume inversely with load demand. Charge induction at ambient pressure is provided with a throttleless carburetor and is manually controlled by a servo-power operator functioning to synchronize a linkage interconnecting the intake valve mechanism with mechanism for varying the cylinder clearance volume. This linkage operates to variably control closure of the intake valve during the intake stroke or, alternatively, to close the intake valve during the initial phase of the compression stroke.

13 Claims, 13 Drawing Figures

HIGH EFFICIENCY VARIABLE EXPANSION RATIO ENGINE

This invention relates to four cycle, spark-ignited internal combustion engines and more particularly, to a unique engine of this type utilizing a throttleless carburetor and having a constant compression ratio and variable expansion ratio over the entire load range.

BACKGROUND OF THE INVENTION

It is well known that as the expansion ratio of an internal combustion engine is increased, more energy is extracted from the combustion gases and the thermodynamic efficiency increases. However, conventional spark ignited internal combustion engines usually have substantially the same compression and expansion ratios, the maximum value of both being determined by the selected compression ratio at full throttle which is preferably just below the point of combustion detonation. Typically, combustion detonation usually occurs at compression ratios ranging from 8 and 12-to-1 depending upon the combustion chamber design, operating conditions and the anti-knock characteristics of the fuel. Equal compression and expansion ratios are desirable at full throttle because the greatest torque output is produced. Under partial load conditions, however, the cylinder pressure-temperature conditions at ignition are well below those that produce detonation, particularly under very low load demand conditions. It is therefore desirable to increase the pressure-temperature levels at part load, an objective achievable by variably reducing the cylinder clearance volume as the charge is decreased in such manner that the compression pressure and temperature parameters remain essentially constant at a level below detonation at all levels. This permits the greatest possible expansion of the combustion gases to take place and consequently provides the highest possible thermodynamic efficiency. In internal combustion engines used to power vehicles wherein a wide range of engine speed and power outputs are essential, a throttle-equipped carburetor is customarily utilized. The carburetor throttle valve controls the charge quantity by restricting the flow to the intake manifold, thereby creating a partial vacuum which limits the charge mass inducted during each piston constant displacement intake stroke. It is well known that throttling the charge involves unavoidable induction pumping work with attendant loss in engine brake efficiency.

Prior art teachings include various proposals for spark ignited internal combustion engines in which the charge mass and clearance volume are varied in unison in accordance with load demand. For example, attempts have been made to maintain the compression pressure nearly constant at all load levels by varying the clearance volume in proportion to manifold pressure. Other designers propose variably delaying closure of the intake valve at or beyond the bottom of the intake stroke to control the charge quantity without need for a throttle valve, the objective being to avoid pumping losses and work to induct the entering charge, but this necessitates making some provision for beneficial utilization of portions of the charge not needed for induction under less than full load conditions. In general, practical considerations necessitate restricting such arrangements to four stroke engines employing four cylinders, or multiples thereof, wherein the intake strokes are symmetrically timed with respect to crank-shaft rotation angle and so designed as to prevent carburetor back flow pressure surges. It has also been proposed to variably advance the closure of the intake valve as it approaches bottom dead center in an effort to control the inducted charge without need for a throttle valve.

It is evident that these prior proposals are subject to certain serious disadvantages and shortcomings avoided by this invention. For example, these prior teachings involve complex constructions which are costly to manufacture, service and maintain. Additionally, many lack feasible and suitable load responsive control means. A further and particularly serious shortcoming of all is the lack of means for avoiding engine pumping looses at less than full load. Illustrative of the state of the prior art depicting these shortcomings are the following U.S. Pat. Nos.: Higginbottom, et al. 887,633; Mono 1,160,970; Salisbury 1,219,781; Spohrer 1,361,110; Halton 1,404,366; Wood 1,539,227; Woolson 1,794,047; Talbot 1,812,572; Cook 2,062,209, Andrean 2,120,012; Hironaka 2,153,691; Aspen 2,387,973; Woodruff 2,433,639; Hickey 2,500,823; Ericson 2,523,105; Pettit 2,589,958; Hickey 2,647,498; Ericson 2,770,224, Biermann 2,873,728; Huber 3,633,552; and Wilson Re. No. 18,595.

SUMMARY OF THE INVENTION

The foregoing and other shortcomings and disadvantages of prior engine proposals are avoided by this invention which virtually eliminates induction pumping work created by throttling, maintains constant compression pressure at all output loads, and makes it feasible to obtain the high efficiency results characteristic of operation at high expansion ratios at all output loads, and particularly over the range including idle and one third of maximum power output where most engine loading occurs during typical automotive operation.

These objectives are achieved by the use of a spark-ignition four-cycle engine equipped with a throttleless carburetor. Constant compression ratio is obtained by the use of a pair of eccentric control or camshaft operable to vary the cylinder clearance volume in combination with dual camshafts with compound rocker arms to control the intake valves, and thereby, the fuel charge inducted at ambient pressure. The compression eccentric control cam shafts are designed to provide constant compression over the full operating load range including maximum load and idling, the maximum pressure preferably being just below that which results in combustion detonation. Power control is provided by a manually controlled servo actuator unit operating a synchronizing linkage interconnecting the intake valves and the cylinder clearance volume control eccentric shaft assemblies. The fuel charge is controlled by the intake valves which are designed to vary the inducted charge by closing variably either during the intake stroke or, alternatively, during different portions of the compression stroke. With either mode, the object served is to harmonize the charge volume with power demand.

It is therefore a primary object of this invention to provide an improved high efficiency internal combustion engine.

Another object of the invention is the provision of a unique internal combustion engine operating at a constant compression ratio at idling and over the full load range.

Another object of the invention is the provision of an improved internal compression engine provided with throttleless carburetion and charge induction at ambient pressure over the full operating range.

Another object of the invention is the provision of an internal combustion engine having a substantially constant compression ratio and intake valves arranged to close at different times depending upon power demand.

Another object of the invention is the provision of an internal combustion engine having intake valve mechanism cooperating with charge induction means to eliminate charge induction pumping losses.

Another object of the invention is the provision of an internal combustion engine provided with an improved mode of controlling the expansion ratio inversely with torque output.

Another object of the invention is the provision of an improved easily-operated manually controlled means for varying the output of an internal combustion engine designed to operate with a constant compression ratio and variable expansion ratio from idling through full power.

Another object of the invention is the provision of a throttleless engine operating with intake valves arranged to close variably with power demand at idling and throughout the full power range.

Another object of the invention is the provision of a throttleless internal combustion engine having the same high compression ratio throughout the operating range and intake valving closing variably with load during the intake stroke.

Another object of the invention is the provision of a throttleless internal combustion engine having the same high compression ratio throughout the operating range and intake valving closing variably with load during the compression stroke.

Another object of the invention is the provision of a high efficiency internal combustion engine provided with means for maintaining the compression ratio constant and synchronized with means for inducting a variable fuel charge at ambient pressure under all operating conditions including idling and the entire power range.

These and other more specific objects will appear upon reading the following specification and claims and upon considering in connection therewith the attached drawing to which they relate.

Referring now to the drawing in which a preferred embodiment of the invention is illustrated:

DETAILED DESCRIPTION OF THE INVENTION

Figure 1:
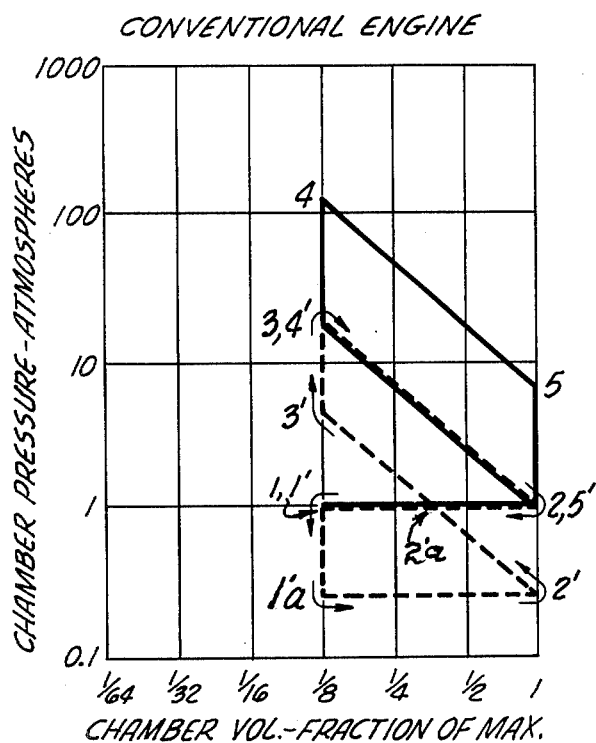
FIG. 1 illustrates log-log indicator diagrams of a conventional throttle-controlled four-cycle engine at full and partial loads, respectively.

The essential thermodynamic characteristics of the two illustrative embodiments of this invention are readily understood by comparing indicator diagrams of the operation of each embodiment with an indicator diagram of a conventional engine. Referring first to FIG. 1, there are shown typical log-log pressure-volume indicator diagrams for an ideal gas in a conventional engine having throttle-controlled carburetion. The solid line diagram represents full load operation and the dash line diagram represents partial load operation. The charge is inducted into the cylinder at 1 as the intake valve opens at top dead center of the intake stroke and closes at 2 as the piston reaches bottom dead center. Compression of the inducted charge begins at 2 and is complete at 3. The charge is ignited and expansion occurs during the power stroke which begins at 3, passes through 4 and terminates at 5 with the opening of the exhaust valve. The combustion products are exhausted during the exhaust stroke which terminates at 1 with the closing of the exhaust valve.

The dash line in FIG. 1 illustrates operation of the conventional-throttle controlled engine at less than full power such as ¼ maximum load. Similar points of the diagram are identified with the same numerals distinguished by a prime. To be noted is the fact that the partially closed throttle valve characteristic of partial load output of a conventional engine restricts charge flow to the cylinder thereby reducing the intake manifold pressure below atmospheric. This pressure reduction is represented at 1' and 1'a, it being recalled that the intake valve closes at 2'. Compression occurs from 2' to 3'; ignition occurs at 3' with expansion taking place along 3', 4' and 5'; and exhaust occuring between 5' and 1'.

Those knowledgeable in the art of internal combustion engines will recognize that:

1. The area enclosed by 1', 1'a, 2' and 2'a represents losses in the form of pumping work performed by the engine and detracting from brake efficiency under partial load.

2. The compression pressure at 3' for partial load is substantially less than at 3 for full load and results in cylinder pressure-temperature conditions below those producing combustion detonation; and 3. The combustion pressure at 4' for partial load is substantially less than at 4 for full load and, importantly, less than that over which expansion could otherwise occur.

Figure 2:
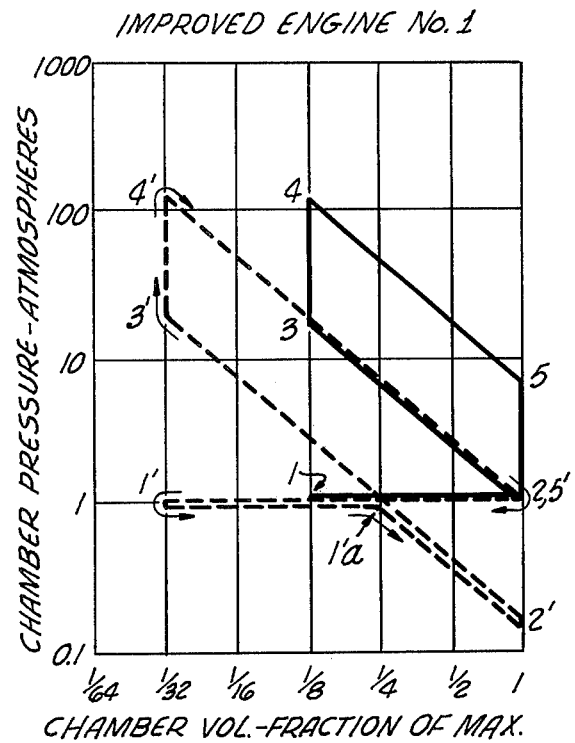
FIG. 2 illustrates similar indicator diagrams of a first preferred embodiment of the invention throttleless engine equipped with intake valves closing variably during the intake stroke and clearance volume control varying in proportion to the inducted charge.

Referring next to FIG. 2, there are shown similar log-log pressure volume indicator diagrams for an ideal gas in an engine according to a first preferred embodiment of my invention wherein the inducted charge is controlled by variably closing the intake valves during the intake stroke, simultaneously, varying cylinder clearance volume with load demand, and maintaining the effective compression ratio constant at or near the point of combustion detonation throughout the operating range. The solid line diagram illustrates operation at full load whereas the dash line diagram illustrates operation at partial load, such as approximately ¼ full load. The numerals designating piston strokes correspond to those of FIG. 1 except that 1′a now designates intake valve closure during the intake stroke under partial load. The solid line diagram is identical with that described above for FIG. 1. Thus, the operation of the invention throttleless engine at full load is the same as for the conventional throttle-controlled engine. At all partial loads, however, it will be recognized that the operating characteristics are substantially improved. Thus, the closure of the intake valve during the intake stroke allows the inducted charge to expand during the remainder of that stroke until the piston reaches dead center at 2′. Work done by the piston during expansion of the charge is recovered during the early part of the compression stroke by ambient pressure acting on the reverse end of the piston. Thereafter, the charge is compressed, ignited, expanded, and exhausted in the normal sequence.

Those knowledgeable in the art of internal combustion engines will recognize that this embodiment of the invention has the following advantageous features:

1. The cylinder chamber pressure remains at ambient during charge induction, and the intake manifold pressure remains essentially ambient at all times;
2. Work done in expanding the charge during the latter part of the intake stroke under partial load is recovered during the early part of the compression stroke with zero net induction pumping work supplied by the engine;
3. Maximum compression pressures at full and all partial loads are the same making it feasible to maintain combustion at or just below the point of detonation throughout the load range.
4. The expansion ratio increases as the load is reduced thereby providing improved thermodynamic efficiency at low load levels.

Figure 3:
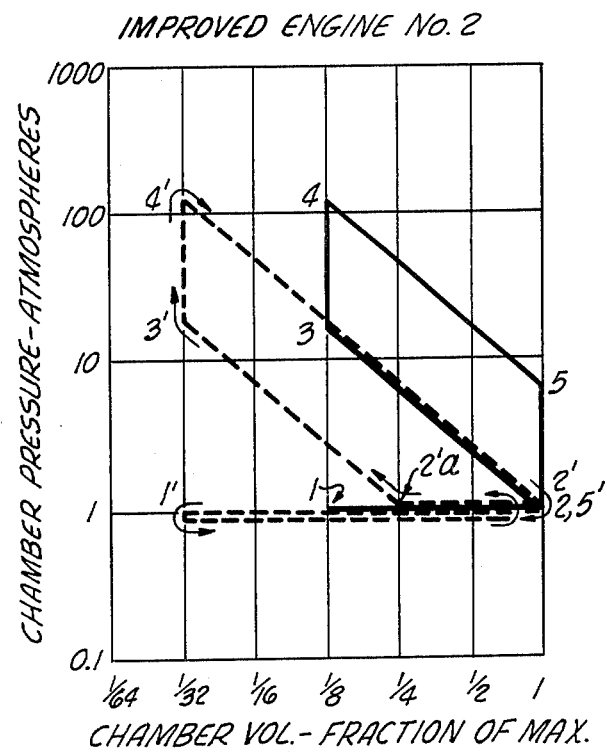
FIG. 3 illustrates similar indicator diagrams of a second preferred embodiment of the invention engine equipped with intake valves closing variably during the compression stroke and clearance volume control varying in proportion to the inducted and retained charge.

Referring now to FIG. 3, there are shown similar indicator diagrams for a second preferred embodiment of my invention wherein, under less than full load conditions, the inducted charge is controlled by variably closing the intake valve during the compression stroke. The cylinder clearance volume is decreased simultaneously with decrease in load, and the compression ratio is maintained constant near but below the point at which combustion detonation would occur at all loads including idling. The solid line diagram illustrates operations at full load. It will be understood that 2′a now designates closure of the intake valve during a compression stroke under partial load. At less than full load, the intake valve remains open into the compression stroke to the extent necessary to expel excess charge back to the intake manifold where it is available for induction into other cylinders. Once the intake valve closes at 2′a, compression, ignition, expansion and exhaust occur as in the conventional engine.

Those knowledgeable in the art of internal combustion engines will recognize that:

1. The intake manifold pressure remains essentially ambient throughout all four cycles and induction pumping work is avoided.
2. The compression pressure at 3′ for partial load corresponds to that at 3 for full load; thus compression temperature-temperature conditions are at or slightly below those producing combustion detonation; and
3. The combustion pressure at 4′ for partial load is essentially that at 4 for full load thereby making it feasible to obtain greater expansion of the combustion gases and thereby improve engine efficiency at part loads.

Figure 4:
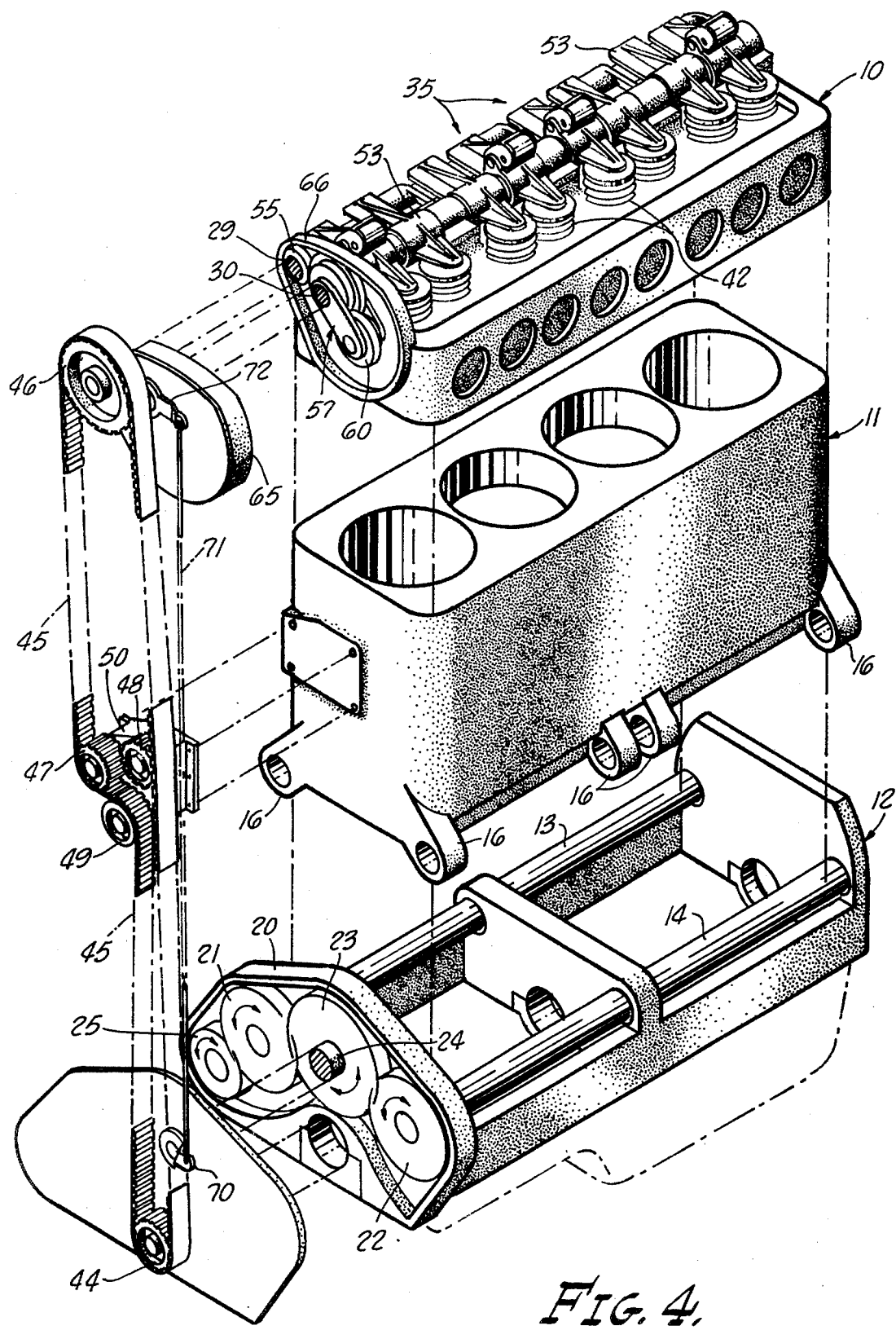
FIG. 4 is an exploded view in perspective of an engine incorporating the principles of this invention.

Referring now more particularly to FIG. 4, there is shown an internal combustion engine embodying a first preferred embodiment of this invention. This engine includes a cylinder head 10 equipped with overhead intake and exhaust valves, a cylinder block 11 and a crank case sub-assembly 12. Sub-assembly 12 is held adjustably assembled to cylinder block 11 by a pair of eccentric control shafts 13, 14 disposed to either lateral side of the engine crankshaft 15 (FIG. 5) and are provided with cylindrical portions journalled in bearings carried by the crank case sub assembly 12. Other portions of the shafts 13,14 are formed with eccentrics journalled in lugs 16 along either lateral side of block 11. Eccentric shafts 13,14 are driven in unison to vary the cylinder clearance volume as will be described in greater detail presently.

As shown, the engine includes four cylinders each housing a separate piston 17 connected by a connecting rod 18 to crankshaft 15. The driving mechanism for shafts 13,14 will be best understood by consideration of FIGS. 4 and 10 where it is shown as enclosed within a housing 20 across one end of the engine. Gears 21, 22 are keyed to a respective one of the eccentric control shafts and interconnected by an idler gear 23 journalled on shaft 24. This train of gears is driven by a gear 25 mounted on the shaft of a control servo motor 26.

Figure 5:
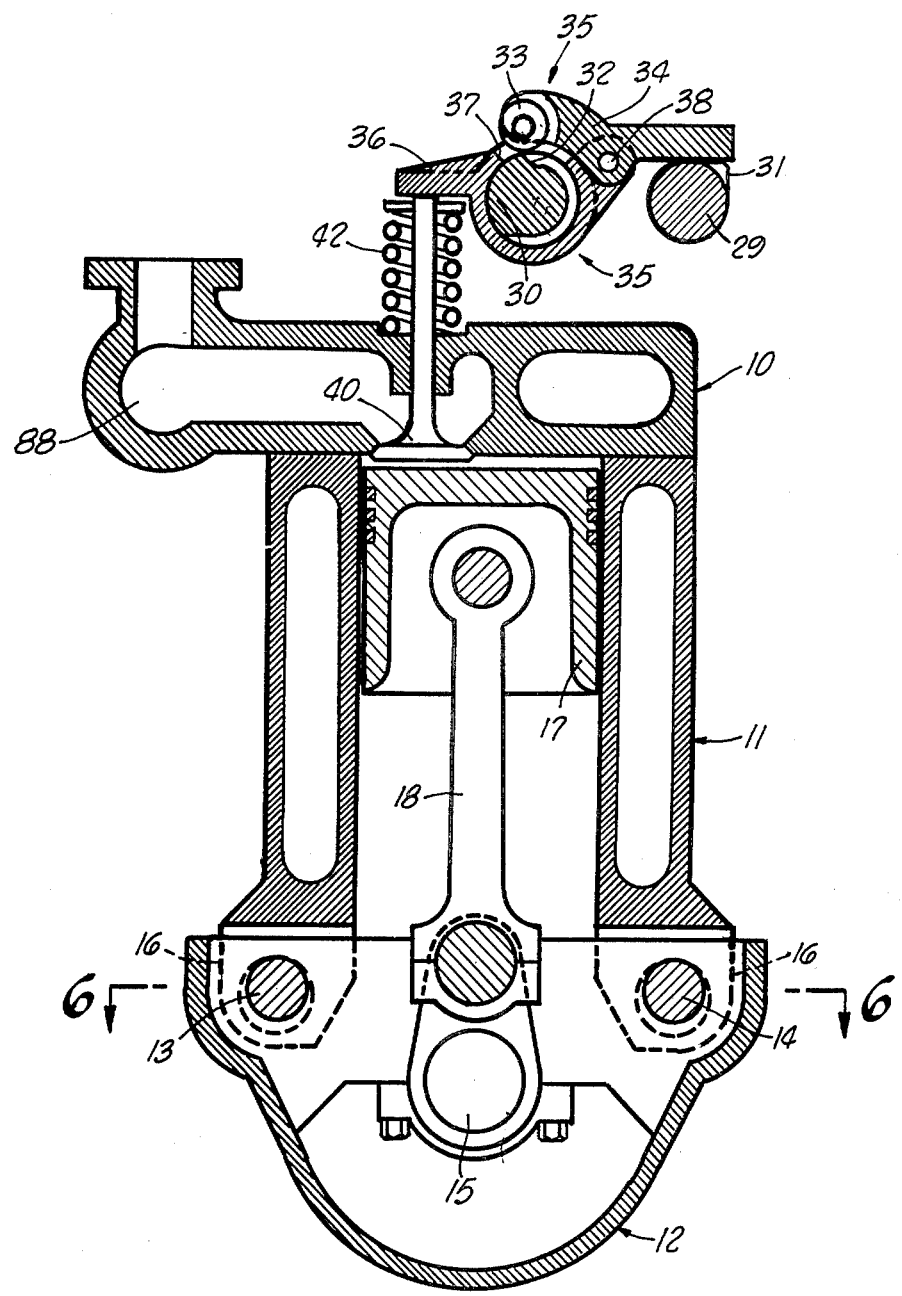
FIG. 5 is a vertical cross-sectional view through one cylinder of the engine showing the piston at top dead center.
Figure 6:
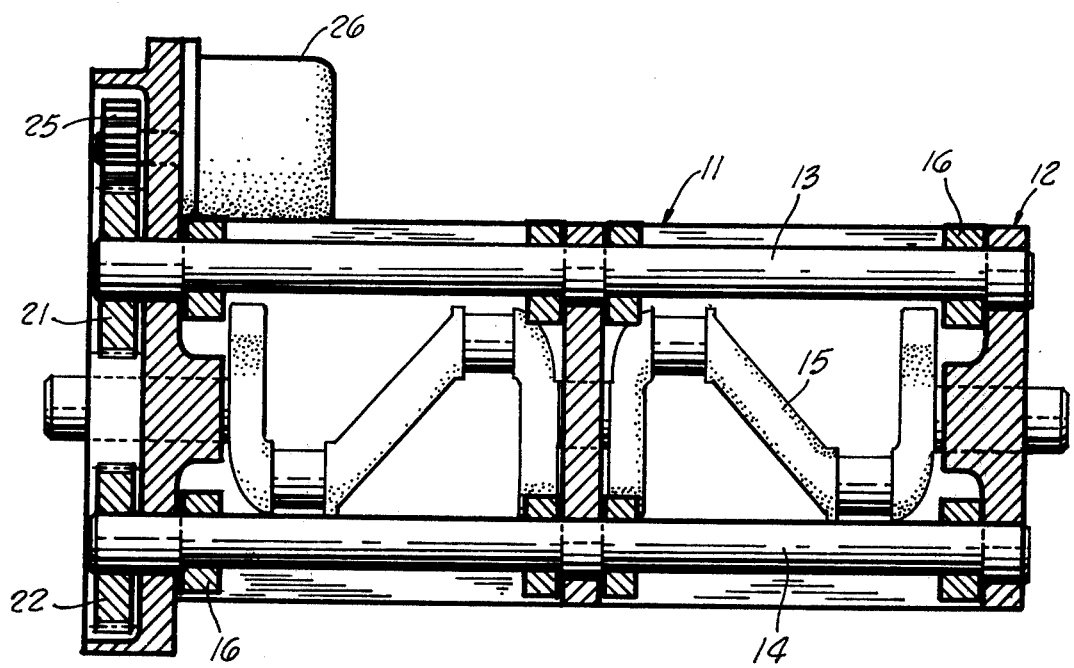
FIG. 6 is a cross-sectional view taken along line 6—6 on FIG. 5.
Figure 7:
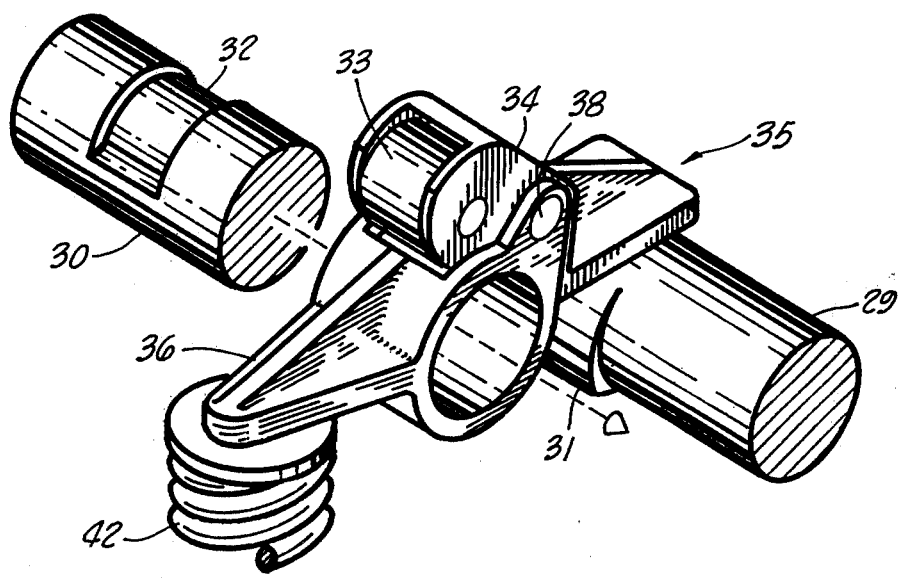
FIG. 7 is a fragmentary exploded view in perspective of an intake valve rocker arm assembly.

Referring now more particularly to FIGS. 4 and 5, the intake and exhaust valve mechanism will be described and, more particularly, the details of the variable intake valve mechanism. The exhaust valves 53 and the operating mechanism therefor is conventional and therefore need not be described. The intake valves are controlled in part by a primary cam shaft 29 and in part by a second camshaft 30 suitably supported in bearings carried by head 10. Camshaft 29 is provided with conventional lifter lobes 31 whereas the secondary camshaft 30 is provided with negative lobes or cam surfaces 32 recessed below the remainder of the cylindrical surface of this shaft. The cam surfaces 32 cooperate with a roller 33 journalled on one end of a rocker arm lever 34 forming part of the compound rocker arm assembly designated generally 35. This assembly includes a first lever 36 journalled on the cylindrical portion of camshaft 30. The midportion of this lever has a slot 37 accomodating roller 33 mounted in the bifurcated end of lever 34. Lever 34 is fulcrumed on pin 38 carried by lever 36.

From the foregoing it will be apparent that, so long as roller 33 is operating on the high side of cam 32, the two arms 34 and 36 of the compound rocker arm operate in unison to operate intake valve 40 under the control of lobe 31 on the primary camshaft 29. However, if the secondary cam shaft 30 is rotated counterclockwise from the position shown in FIG. 5, roller 33 will ride down along the sloping side of cam surface 32 with the result that the two arms 34 and 36 of the compound rocker arm will act to initiate progressive closing of the intake valve. Intake valves 40 are biased toward their closed position by the usual valve compression springs 42.

Figure 10:
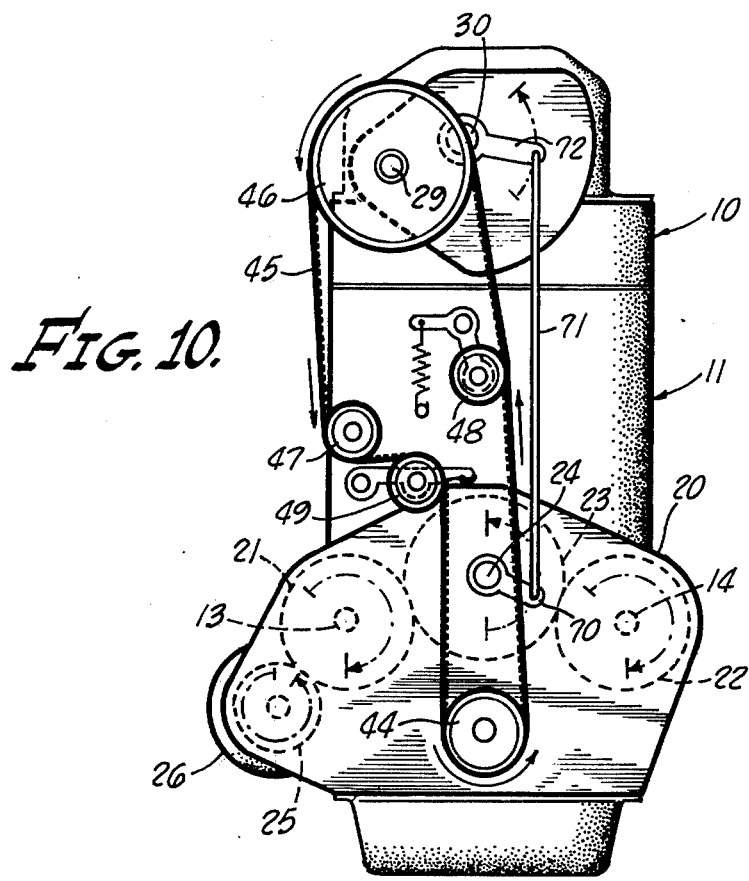
FIG. 10 is a front elevational view of the engine.

The synchronizing control interconnecting the clearance volume control eccentric shafts 13, 14 and the valve operating camshaft 29 and 30 is shown in FIGS. 4 and 10 to which reference is now had. The primary camshaft 29 is driven directly from the engine crankshaft by sprocket 44 mounted thereon and a tooth belt 45 in mesh with sprocket 46 mounted on the outer end of cam shaft 29. Belt 45 passes over a suitable slack takeup and tension control assembly including a pair of slack takeup idlers 47, 49 cooperating with an adjustable tensioning idler 48 all supported on a mounting 50 attached to one end of the cylinder block 11. It will be understood that any suitable slack compensating and tensioning control means may be used to maintain the timing belt 45 properly tensioned.

Figure 8:
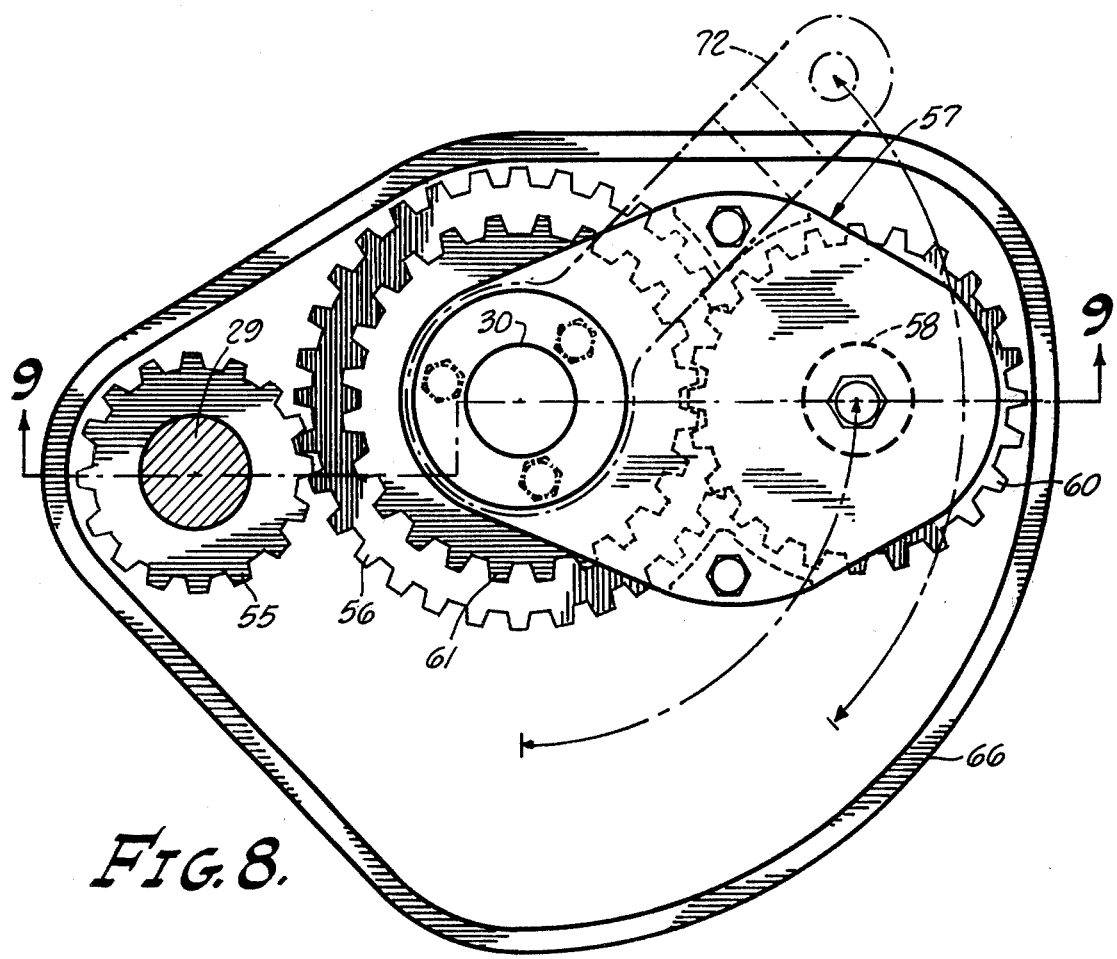
FIG. 8 is a cross-sectional view taken generally along line 8—8 on FIG. 9 showing the secondary camshaft drive and angular displacement control mechanism with the housing cover removed.
Figure 9:
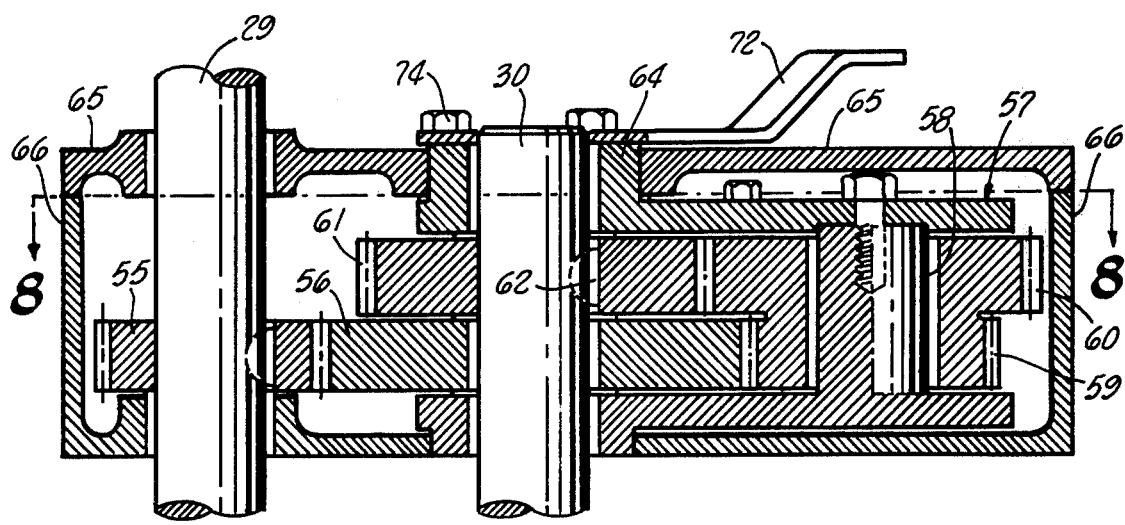
FIG. 9 is a cross-sectional view taken along the broken line 9—9 on FIG. 8.

Referring now to FIGS. 8 and 9 it will be noted that the primary valve camshaft 29 supports a gear 55 which is driven at one-half the speed of crankshaft 15 and is in mesh with a gear 56 loosely journalled on secondary cam shaft 30. Also swingably journalled on the latter camshaft is a U-shaped bracket 57 having a shaft 58 in its bight portion on which is journalled a gear 59 in mesh with gear 56. Gear 59 is integral with a second gear 60 which drives a gear 61 keyed by key 62 to camshaft 30. One hub 64 of bracket 57 extends through the cover 65 of a housing 66 for the sprockets just described.

Gear 59, having the same pitch diameter as gear 55 and being driven through idler 56, therefore rotates at the same speed as gear 55. Gear 60, which is fixed to gear 59, drives gear 61 fixed to secondary camshaft 30 and has the same pitch diameter as gear 60. Thus secondary camshaft 30 rotates in synchronism with camshaft 29 but may be displaced in phase as determined by the angular position of the U-shaped bracket 57 which is manually controlled as will now be described.

The variable cylinder clearance control eccentric shafts 13, 14 are connected to the secondary swinging bracket 57 controlling closing of the intake valves by synchronizing linkage means operable by the manually controlled power control unit shown in FIG. 10, 11. The synchronizing linkage between the eccentric shafts 13, 14 and swinging bracket 57 includes the gears 21, 22, 23 interconnecting eccentric shafts 13, 14 the gears just described in connection with FIGS. 8 and 9, the lever 70, link 71, and lever 72 (FIGS. 4 and 10). Operating lever 70 is fixed to shaft 24 supporting gear 23 (FIG. 4) and lever 72 is fixed by cap screws 74 (FIG. 9) to hub 64 of the swinging bracket 57.

Figure 11:
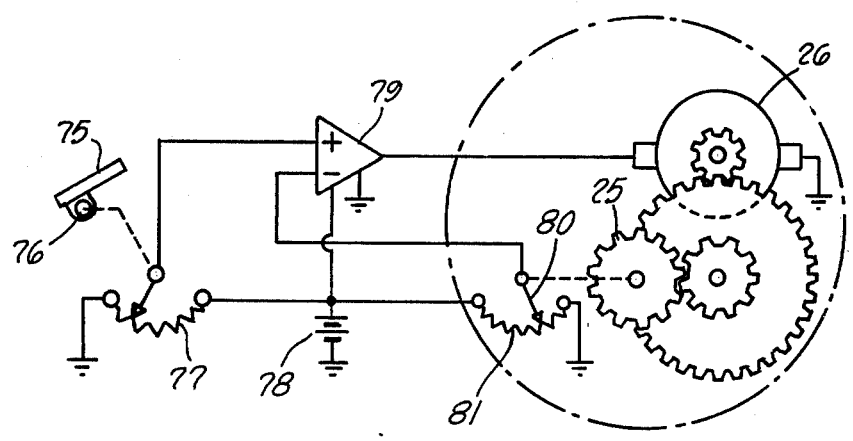
FIG. 11 is a combination schematic and diagrammatic view of the manually controlled power actuator for the engine.

The manually controlled servo unit controlling the operation of this synchronizing linkage is diagrammatically shown in FIG. 11. As there shown by way of illustration, the control typically includes a manually operable accelerator pedal 75 suitably pivotally supported at 76 and controlling a voltage divider 77 connected to a source of power 78. The output of voltage divider 77 is applied to the input of a drive amplifier 79 controlling the power input to the servo motor 26. Motor 26 is connected through suitable speed reduction gearing to driving gear 25 (FIGS. 4, 10) of the synchronizing linkage just described. Gear 25 also advances or retracts a wiper arm 80 of a feedback potentiometer or voltage divider 81. The output of divider 81 is subtracted from the load command signal controlled by divider 77 supplied to the differential comparator and drive amplifier 79 and is effective to modify the drive signal to servo motor 26. In this manner the output gear 25 of servo motor 26 is advanced or retracted to the exact position desired by the operator by manually manipulating accelerator pedal 75. It will be understood that power assist means other than an electro-mechanical means may be utilized to operate gear 25 as, for example, either hydraulic or pneumatic operated servo motor means well known to persons skilled in the servo power art.

ALTERNATIVE EMBODIMENT

Figure 12:
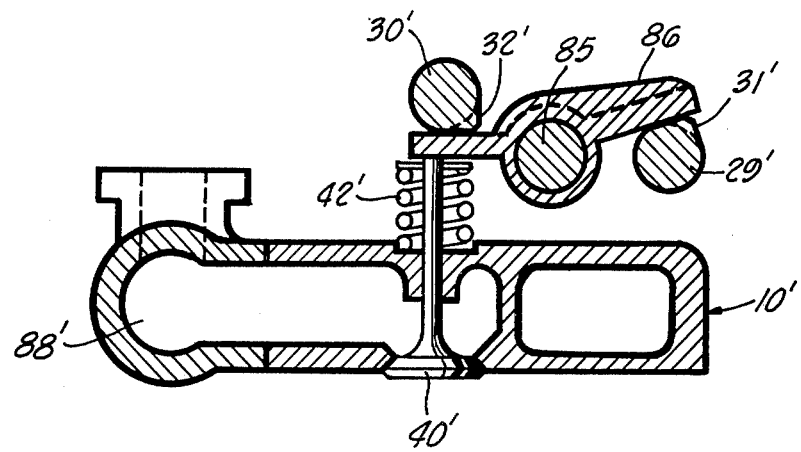
FIG. 12 is a fragmentary cross-sectional view of a modified embodiment of the invention engine differing in the provision of a modified rocker arm and intake valve mechanism.
Figure 13:
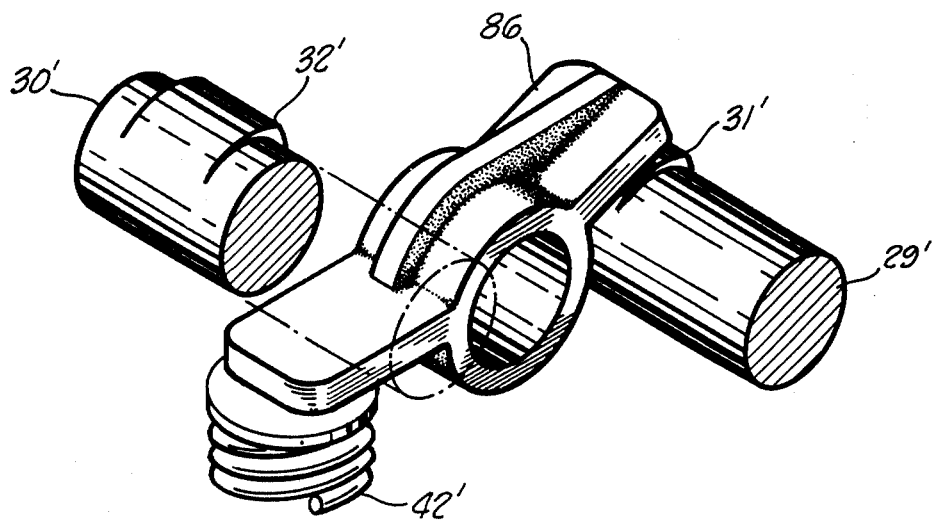
FIG. 13 is an exploded view in perspective of the rocker arm operating components for the FIG. 12 intake valve.

FIGS. 12 and 13 serve to illustrate the principles of an alternate embodiment of this invention which differs from the above described embodiment of FIGS. 4–11 in that the intake valves and their operating mechanism is designed to close the intake valves variably during the initial phase of the compression stroke. The same reference characters employed above will be used to describe the same or similar parts but are distinguished therefrom by the addition of a prime.

In this second embodiment, a common rocker shaft 85 is provided for both the rocker arms 86 for intake valves 40' and the unshown exhaust valve tappets. The right hand end of intake rocker arm 86 bears against the primary camshaft 29' and the other end bears against the stem of intake valve 40' and underlies the secondary camshaft 30'. It will be noted that camshaft 30' is provided with protruding lobes 32' in contrast to the negative cam surfaces of the first described embodiment. Lobes 32' are so related to lobes 31' as to maintain the intake valve variably open for a selected portion of the compression stroke depending upon power requirements.

The fuel supply to the intake manifold 88 or 88' of both embodiments has not been shown but it will be understood that the carburetor is of the conventional type except that the throttle valve is deleted to provide throttleless carburetion. It will also be understood that well known fuel injection systems may be utilized and that throttleless carburetion as used throughout this specification and the claims herein made are intended to include both categories of charge mass induction. Accordingly, incoming air at atmospheric pressure mixes with fuel in the proportion to form an explosive charge as an incident to the operation of the intake stroke of each cylinder. This fuel charge at ambient pressure is inducted into the cylinder during downward movement of the piston with the intake valve open beginning at top dead center of the intake stroke. In the first described embodiment illustrated in FIGS. 4-11, the charge volume varies in dependent upon power demand as determined by the variable closing of the intake valve during the intake stroke. A maximum charge is inducted to provide maximum power when the intake valve closes near bottom dead center. Idling, of course, requires a minimum charge and, accordingly, the intake valve closes relatively early during the intake stroke.

If maximum power is required, the necessary maximum fuel charge is accommodated at the same high compression ratio as for idling and partial load operation by increasing the cylinder clearance volume of the combustion chamber. This is achieved by the synchronizing linkage interconnecting the intake valve operation and the clearance volume control eccentric shafts 13, 14. These latter eccentric shafts are rotated by the servo-operator to provide the maximum clearance volume for full power operation and minimum clearance volume for idling operation with substantially the same maximum compression pressure as for full torque output. Likewise, the same operating characteristics prevail for any selected partial load operating condition easily and readily obtained at minimum effort by the operator simply by depressing or relieving pressure on the manual control pedal 75. This control is so arranged that operation from idling to full power is provided with somewhat less than one full revolution of the servo motor drive gear 25.

While the particular high efficiency variable expansion ratio engine herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. In a spark-ignition, variable-expansion ratio, four-cycle engine of the type having a plurality of cylinders equipped with pistons all of which have a power output driving connection with a common crankshaft and including means directly connected to said common crankshaft for varying the cylinder clearance volume under different power demand conditions, that improvement which comprises:

throttleless carburetor means for supplying a combustible charge to said cylinders, including a separate intake valve for each cylinder operatively connected to said crankshaft, and further including means for closing said intake valve selectively not later than bottom dead center of the intake stroke as necessary to provide a charge corresponding to torque output requirements between idling and full power, and means for closing said intake valves and for operating said means for varying the cylinder clearance volume in synchronism with the closure of said intake valves and thereby effective to maintain the engine compression ratio substantially constant over the full range of torque outputs and to increase the engine expansion ratio as the torque output is reduced.

2. The combination defined in claim 1 characterized in that said means for varying the cylinder clearance volume includes a pair of synchronized eccentric shaft means effective to vary the expansion ratio of said engine throughout the power range thereof.

3. The combination defined in claim 1 characterized in the provision of manually controllable power assist means for regulating the charge supplied to said cylinders thereby to vary the torque output of said engine.

4. The combination defined in claim 3 characterized in that said manually controllable power assist means includes voltage divider means manipulatable by the operator to control the power output thereof.

5. The combination defined in claim 1 characterized in that said intake valve means includes compound rocker arm means journalled on a first valve camshaft and rotatable through an arc in unison with adjustment of said means for varying the cylinder clearance volume, said rocker arm means having one end thereof positioned to open said intake valve and pivotally supporting the midportion of a lever, said lever having one end bearing against a second engine-driven camshaft and its other end selectively engageable with a portion of said first camshaft contoured to advance and delay the closing of said intake valve selectively depending on the direction of arcuate movement imparted to said first cam shaft during changes in the power output of said engine.

6. The combination defined in claim 1 characterized in that said engine includes a cylinder block subassembly and a crankcase subassembly interconnected by eccentric shaft means disposed laterally of and parallel to the axis of the engine crankshaft, and said means for varying the cylinder clearance volume including said eccentric shaft means and an operating connection to said means for closing said intake valves.

7. The combination defined in claim 1 characterized in that said means for varying the closure of said intake valves is operable to close the same variably beginning with an early part of the charge intake stroke under engine idling conditions and beginning at progressively later stages of the charge intake stroke in synchronism with and depending upon increasing power demand.

8. The combination defined in claim 6 characterized in that said eccentric shaft means includes a pair of similar eccentric shafts located one on either lateral side of and parallel to the axis of the engine crankshaft and means to adjust said eccentric shaft means in synchronism with one another.

9. The combination defined in claim 8 characterized in that said means for synchronizing the operation of said pair of eccentric shaft means includes gear train means.

10. The combination defined in claim 5 characterized in the provision of drive means interconnecting said first and second camshafts normally driving the same in synchronism and including angular displacement control means for changing the driving phase relationship of said camshafts relative to one another thereby to vary the closing of said intake valves during the intake stroke.

11. The combination defined in claim 10 characterized in the provision of manually controllable power assist means for regulating the charge supplied to said cylinders thereby to vary the torque output of said engine, said means operatively interconnecting said power assist means and said means for changing the phase relationship of said first and second camshafts to one another.

12. The combination defined in claim 10 characterized in that said drive means interconnecting said first and second camshafts comprises gear train means.

13. The combination defined in claim 12 characterized in that said gear train means includes a pair of gears of different sizes axially fixed together and in mesh with a respective gear mounted on one of said camshafts and only one of which last mentioned gears is fixed to said one camshaft, and said pair of gears being shiftable in an arc about said one camshaft to vary the driving phase relationship between said first and second camshafts.

* * * * *